ions, 5 Drawing Figures

United States Patent [19]

Meunier

[11] 4,423,558
[45] Jan. 3, 1984

[54] DEVICE FOR HEAT EXCHANGE BETWEEN SOLID PARTICLES AND A GAS CURRENT

[75] Inventor: Georges Meunier, Fontaines Par Chagny, France

[73] Assignee: St. Gobain Vitrage, Courbevoie, France

[21] Appl. No.: 489,601

[22] Filed: May 2, 1983

Related U.S. Application Data

[63] Continuation of Ser. No. 227,390, Jan. 22, 1981, which is a continuation of Ser. No. 75,125, Sep. 13, 1979, abandoned, and Ser. No. 76,464, Sep. 17, 1979, abandoned.

[30] Foreign Application Priority Data

Sep. 21, 1978 [FR] France ............................. 78 27054
Sep. 21, 1978 [FR] France ............................. 78 27057

[51] Int. Cl.³ ................................................. F26B 17/10
[52] U.S. Cl. ....................................... 34/57 A; 34/86; 34/210; 34/215; 432/58
[58] Field of Search ............... 110/245; 34/57 A, 10, 34/86, 129, 210, 212, 215; 432/15, 58

[56] References Cited

U.S. PATENT DOCUMENTS 2,774,661 12/1956 White .
3,238,634 3/1966 Goins ......................................... 34/10
3,503,790 3/1970 Gringras ................................. 34/57 A
3,907,955 9/1975 Meunier .
4,142,302 3/1979 Primus ..................................... 34/216

FOREIGN PATENT DOCUMENTS 942741 2/1949 France .
978287 4/1951 France .
1187105 9/1959 France .
2066178 6/1971 France .
676613 7/1952 United Kingdom .
781994 8/1957 United Kingdom .

OTHER PUBLICATIONS

Dr.-ing. K. Roben und Dipl.-ing. E. Steffen, Hamburg, Aufbereitungs-Technik Article, 1974, pp. 665-669.

Primary Examiner—Larry I. Schwartz
Attorney, Agent, or Firm—Pennie & Edmonds

[57] ABSTRACT

A heat exchanger for exchanging heat between solid particles and a gas where the particles fall vertically through a column under gravitational forces and the gas flows upwardly in the column. The heat exchanger has at least one stage in the column including a stack of packing elements supported by a support having openings through which gas may flow at a velocity sufficient to form a loose fluidized bed of particles. A grill is positioned in the lower part of the column through which gas may flow to support a dense fluidized bed of particles.

16 Claims, 5 Drawing Figures

DEVICE FOR HEAT EXCHANGE BETWEEN SOLID PARTICLES AND A GAS CURRENT

CROSS-REFERENCE TO OTHER APPLICATIONS

This application is a continuation of my copending application Ser. No. 227,390 filed Jan. 22, 1981, which in turn is a continuation of my applications Ser. No. 075,125 and Ser. No. 076,464 filed Sept. 13, 1979 and Sept. 17, 1979, respectively now abandoned.

FIELD OF THE INVENTION

The invention relates to a heat exchanger for exchanging heat between solid particles and a gas where the exchanger has a vertically extending packed column in which the particles fall and in which preferably the gas rises and also in which a grill placed in the lower portion of the column through which the gas flows to fluidize a bed of solid particles supported by the grill.

BACKGROUND OF THE INVENTION

Various processes involving contacting solid particles with a gas are utilized to perform physical or chemical modifications to the particles and/or to the gas. Such processes include, for example, drying, heat exchange and catalytic oxidation processes.

One such process includes having gas flow in one direction through an unpacked column where the gas contacts solid particles flowing in an opposite direction through the column. The yield of such an installation is generally low, and in order to obtain satisfactory efficiency, requires the use of very large volume exchangers.

Other processes proposed for catalytic reductions have utilized dense one-stage fluidized beds. However, when dense one-stage fluidized beds are used in a heat exchanger, the efficiency of the heat exchanger has only been mediocre because the temperature of the solid particles and gas stabilizes in the bed at a level mid-way between the input temperature of the particles and gas and any exchange ceases when this level is reached.

It has been proposed to use a cascade of dense fluidized beds in an exchanger to transfer heat from a fluidization gas to solid particles. Such use of cascades, however, results in large load losses in circulating the gas through the chamber which is often incompatible with available gas pressures.

To reduce this disadvantage, columns with dense fluidized beds have been equipped with "weeping" type grills or supports (i.e. grills having an opening rate or porosity on the order of 7–20% where the grill acts as a dual flow grill and where the passage of solid particles through the openings of the grill are voluntary and controlled as contrasted with grills which are not of the "weeping" type and which have an opening rate or porosity on the order of 1–2%). The use of weeping or dual flow grills permits the elimination of overflows or of pressurized ducts with valves for the passage of the solid particles from one level to the other. This arrangement has, however, the disadvantage that its operating stability is relatively low.

It has been suggested that, in order to make the operation more stable, packing elements be placed on the fluidizing grill or support and it has actually been observed that this design eliminates the "throwing up" phenomena (direct passage of gas and/or solids through the bed) and improves the homogeneity of the bed, particularly if the grill is of the "weeping" type.

It is nevertheless true that a heat exchanger comprising such beds in cascade has a comparatively narrow operating range and requires a high gas pressure.

Heat exchangers are also known having loose beds which comprise one or several stacks of packing elements with the packing elements being supported by grills having openings above 25%. The solid particles in these exchangers flow downwardly by gravity inside the packing elements and encounter a gas flux which suffers a pressure drop that is much smaller than that which characterizes the dense beds which add the large pressure drop in the fluidizing grill and the hydrostatic pressure drop in the dense bed, as in practice the pressure drop in a loose bed with packing elements is almost independent of the presence of solid particles and depends essentially on the characteristics of the support or grill on one hand, and the layers of packing elements themselves, on the other hand, Such a device is described, for example, in French patent No. 978,287 in which it is stated that the gas velocity above and below the packing elements must remain below the average free-fall velocity of the solid particles. This patent states also that the particles are in a state of fluidity between the packing elements which may comprise, for example, Raschig rings. This process has been applied in heating sand for glass making as disclosed in U.S. Pat. No. 3,503,790.

In all of the exchangers as outlined above, there is some load loss involved in moving the gas through the exchanger and the efficiency of transfer of heat between the particles and the gas is less than optimum. It is therefore an object of the present invention to improve the efficiency of heat exchange between solid particles flowing in one direction through a heat exchanger having packed elements and a gas flowing in an opposite direction while at the same time reducing the load loss involved in moving the gas through the exchanger.

The device disclosed in the U.S. patent comprises a column having a plurality of grills in its upper part supporting packing elements and a hearth in its lower part provided with burners. The device of this patent, however, only heats the sand to a temperature of approximately 800° C.

It has also been found that for higher temperatures, fritting of the sand particles occurs with the fritted particles clogging the packing elements. Further, temperatures in excess of 800° C. requires the use of special materials in the packing elements which, from a mechanical viewpoint, are resistant to creep, and from a chemical viewpoint, are resistant to oxidation.

A further difficulty occurring with the operation of the device disclosed in the aforementioned U.S. Patent is that the device does not always provide a flow of particles which is homogeneous in temperature.

It is therefore a further object of my invention to provide for a heat exchanger by which heat may be efficiently exchanged between solid particles and a gas in which the flow of the gas will be homogeneous in temperature and velocity and in which solid particles may be heated at higher temperatures than the usual temperatures for avoiding fritting of the particles and without requiring that the packing elements be made of oxidation or creep resistant material.

DISCLOSURE OF INVENTION

It have found that when solid particles flow in one direction in a column by gravity forces against a gas moving in an opposite direction and where the column has at least one stage made up of a stack of packing elements placed on a support, openings in the support have an effect on heat exchange between the particles and the gas current. In particular I have found that if the porosity of the openings in the support is such that the load loss or specific pressure drop of the gas flowing through the openings of the support is negligible when compared with the load loss or specific pressure drop of the gas flowing through a stack of packing elements, there will be a suspension of particles that is more homogeneous and denser in the upper part of the stack than in the lower part of the stack. In this instance specific pressure drop is defined as pressure drop occurring over one unit of the vertical height of the stack or one unit of the vertical thickness of the support. This type of flow of gas and of the particles results in an efficient heat exchange between the particles and gas and at the same time results in slight load loss necessary to move the gas through the stack.

The flow as described above, which is different from that observed in packed dense fluidized beds, can be effectively obtained only if the openings in the support are of such a size and number that the velocity of the gas passing through the openings is such that a loose fluidized bed is formed from the particles contacting the support.

Further I have found that if the openings in the support are reduced in size to increase the retention of solids so as to approach the technique of dense fluidized beds, then the preferred flow condition as outlined above will not be maintained between the packing elements with the result that the load loss required in moving the gas through the stack is increased while at the same time the efficiency of the exchange of heat between the gas and the particles is decreased.

Broadly the invention comprises a heat exchanger for exchanging heat between solid particles and a gas where the exchanger has a vertically extending column. Solid particles flow through the column in one direction by gravitational forces while gas flows in an opposite direction. The heat exchanger contains at least one stage in the column where the stage has a stack of packing elements. The stack of packing elements in turn is supported by a support having openings therein through which the gas may flow at a velocity which will form a loose fluidized bed in contact with the support. The openings in the support comprise meshes the porosity of which is at least 75% of the porosity of the stack of packing elements and preferably is 90% of the porosity of the packing elements. While a theoretical acceptable porosity limit of the meshes in the support is on the order of 7% for obtaining voluntary weeping of the support, such a choice is unsuitable because of excessive load requirements imparted to the gas as it passes through the openings. Further a grill is positioned in a bottom part of the column and supports a dense fluidized bed of solid particles with bed being fed by the gas passing through the grill.

I have found that the efficiency of a stage in the column does not increase noticably as the height of a stack of packing elements is increased. Thus it is possible to limit a stack to a relatively small height without noticably effecting efficiency and it appears advantageous to use several stages having small stack heights rather than a single stage having a larger stack height.

Further I have found that the economically optimal height of a stack is a decreasing function of the velocity of the gas passing through the stack. For example, when heat exchange is performed between hot air at 250° C. and sand having an average diameter of 200 $\mu$m in a column having a stack of packing elements with an average diameter between 10 and 30 mm., the stack height at which the heat exchange is at a maximum is about 15cm. where the gas velocity is 1.3 m/s and about 40 cm. where the gas velocity is 1.0 m/s.

Thus it is a characteristic of the present invention that to increase the overall efficiency of a heat exchanger having a column of constant section, that several stages are utilized and that the stack height of each stage is adjusted to the velocity of the gas passing through that stage, i.e., a greater stack height is used for upper stages when the column functions as a gas cooler while a greater stack height is used for the lower stages when the column is used as a gas heater.

Further I have found that the efficiency of the exchange of heat between the particles and the gas is optimal when the height of each stage is approximately 3 to 20 times the height of each packing element.

I have found in addition that the efficiency of exchange of heat between the particles and gas in a particular stage is at a maximum where the average velocity of the gas, just under the stack, is close to the maximum free fall velocity of the solid particles passing through the stage. I have even found, contrary to the teaching of French Pat. No. 978,287, that it is possible to make the exchanger operate at average gas velocities, taken just under the packing elements, that are considerably higher than the average free fall velocity of the solid particles thus making it possible for a conventional apparatus to obtain an increase in treating capacity. In practice, however, this operation is possible at gas velocities only up to a maximum of 1.5 times the maximum free fall velocity of the solid particles.

Taking into account the above findings, it is advisable to use several stages having relatively low stack heights and to make the gas flowing into the hottest stage have the highest possible velocity, i.e., a velocity greater than the average free fall velocity of the particles and less than 1.5 times this velocity, and to make the gas flowing into later or cooler stages flow at a velocity which is close to or slightly less than the corresponding free fall velocity of the particles such that in each stage the closest possible conditions corresponding to the maximum efficiency are achieved. Thus to increase the overall efficiency of heat exchange in a heat exchanger, a multi-stage column should be used in which the velocity of the gas is adjusted so that at the input to each stage, the velocity is at an optimum, i.e. near the average free fall velocity of the particles.

In a heat exchanger having a column with a constant cross-section, the velocity of a gas used to heat solid particles diminishes as the gas rises while the average free fall velocity of the particles increases. In order to adjust the gas velocity, heat exchangers may be designed where the cross-section of the stages diminish in the direction of flow of gas so as to maintain the gas velocity at its optimum value in each stage.

Where a heat exchanger having a column of constant cross-section is used to transfer heat from solid particles to a gas, the gas current velocity increases as it rises whereas the average free fall velocity of the particles tends to decrease. In such an instance, the gas velocity can be adjusted by utilizing stages the cross-sections of which increase in the direction of gas flow so as to maintain velocity of the gas at its optimum value in each stage.

In order to maintain the optimum gas velocity as explained above, it is possible to use stages wherein the cross-section of a stage varies between two column portions of different diameters, to use stages of different diameters connected by column portions of varying cross-sections, and to use a tapered column in which stages of varying cross-sections are positioned.

The presence of a fluidized bed in the bottom part of the column increases the function of the packed exchanger by providing for a parallel flow of gas which is homogeneous in temperature and velocity which in turn further assures homogenization of temperature of the solid particles.

Use of such a heat exchanger makes it possible to heat solid particles, and particularly sand particles, to temperatures in the neighborhood of 1200° C. which could not be done using the device disclosed in the aforementioned U.S. Patent. Contrary to what might be expected, the temperatures on the order of 1200° C. obtained in the fluidized bed do not result in excessive temperatures in the packing elements, and even in the lowest stage of packing elements, the temperature of the solid particles will not exceed 800° C.

Fritting of the sand particles does not appear to occur either in the stages of the packing elements or in the fluidized bed itself. Since the temperatures of the packing elements do not exceed 800° C., it is not necessary that the stages containing these elements be constructed of any special high refractory materials.

In comparison with a simple dense fluidized bed, the heat exchanger of the invention provides a much greater heat efficiency and heat recovery. This is because with a simple fluidized bed, the heat of the gas leaving the fluidized bed is totally lost. In the present invention, this heat is in a great part recovered in the stages containing the packing elements which are placed above the fluidized bed. The number of stages can be multiplied until the dew point of the gas passing through the stages is reached.

In a particular embodiment in the heat exchanger which is intended for heating solid particles, the exchanger is fed air in the bottom of the column and at least one burner is placed above the grill through which a combustible substance may be injected into the bed. This embodiment further preferably includes a preheating burner by which air passing into the column may be preheated in order to assure firing of the fuel injected directly into the bed in the event that the bed is below 600° C.

BEST MODES FOR CARRYING OUT THE INVENTION

Figure 1:
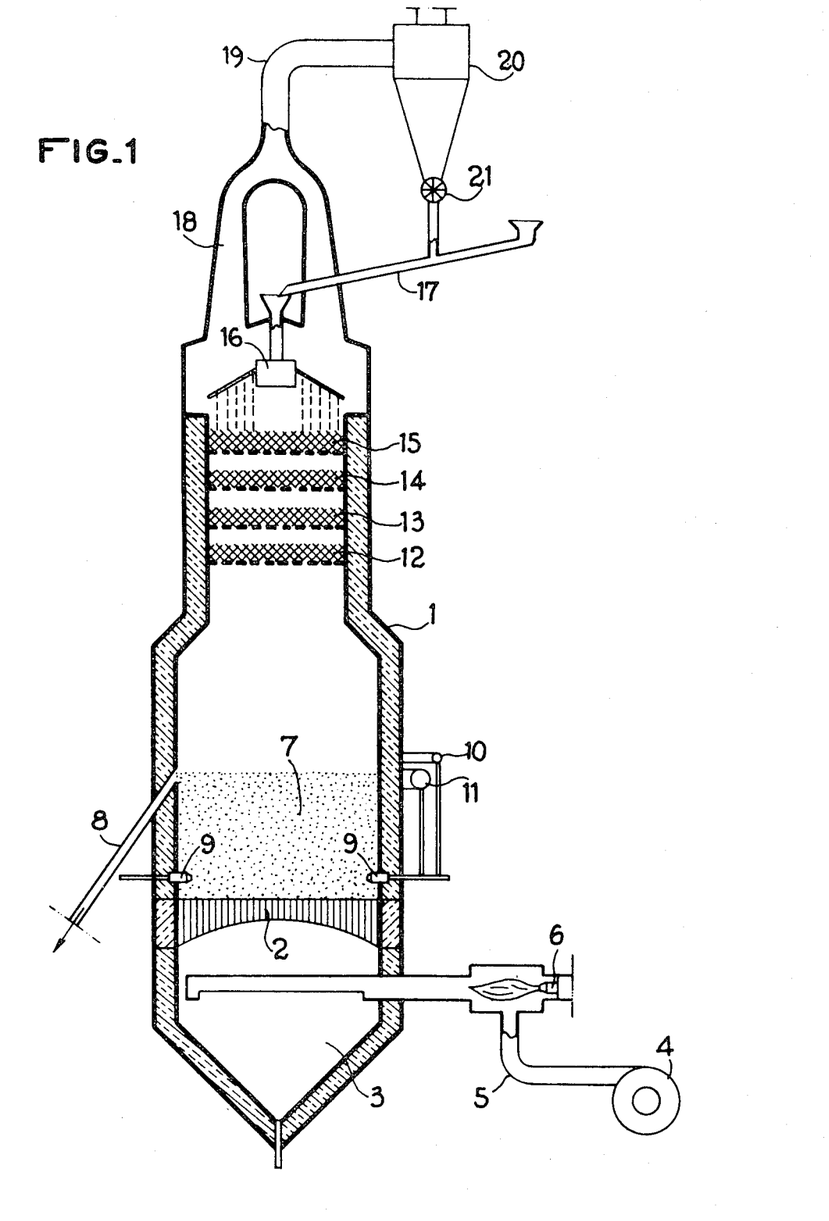
FIG. 1 is a schematic sectional view of a heat exchanger constructed according to the invention having a plurality of stages where each stage has a support and a stack of packing elements.

Referring to FIG. 1, there is illustrated a heat exchanger comprising a cylindrical column 1 the inside of which is lined with refractory bricks. As shown, the lower part of the column has a diameter about ⅓ greater than that of the upper part and the two parts are connected together by a truncated zone. The lower part of column 1 comprises a fluidization grill 2 under which is positioned a wind box 3 which is supplied by an air compressor 4 by means of conduits 5 in which is placed a pre-heating burner 6 fed by domestic fuel oil.

Grill 2 supports a bed 7 of fluidized particles the excess of which is evacuated by side overflow conduit 8. Burners 9 placed within bed 7 are fed on fuel oil and scavenging air respectively by distributors 10 and 11.

The upper part of the column includes four stages, 12, 13, 14 and 15 each of which comprises a large mesh grill on the order of 60×20 mm. made of a plurality of refractory steel strips 15 mm.×1 mm. on edge and which are spot-welded together. The grill has a porosity of 93% and supports a stack made up of 25×25 mm. refractory steel Pall rings having a 94% porosity.

A rotary solid particle distributor 16 distributes particles over the entire cross-sectional surface of stage 15 which is the highest stage. The particles are fed into the distributor by a conduit 17. A flue 18 is positioned at the top of the column for evacuating the gas which then flows through pipe 19.

A cyclone 20 connects with pipe 19 to separate fine particles that may be entrained in the gas evacuated from the column. The particles separated by cyclone 20 are reinjected into the heat exchanger by way of a rotary shutter 21.

By way of example, an exchanger of the type illustrated in FIG. 1 with a column having a diameter of 1.45 m. and including packing element stacks 15 cm. high was made to operate when particles of sand having the following granular size were fed into the column:

| | |
|---|---|
| 1% | < 100 μm |
| 18% | < 160 μm |
| 45% | < 200 μm |
| 80% | < 250 μm |
| 99% | < 400 μm |

Sand delivery was 3250 kg/h while the input temperature of the sand at the upper part of the column was 25° C.

Preferably the amount of fuel injected into the column in relation to the amount of air fed into the column was regulated so that there was a 5-10% excessive amount of air.

The gas deliveries are expressed below with the values corrected for normal conditions. The fluidization air delivery that is air delivered beneath the grill was 1450 m³/h while the delivery of air of the fuel oil injectors and draft holes was 200 m³/h. Fuel oil delivery was 113.5 kg/h and fume delivery was 1715 m³/h.

The air input temperature was 40° C., the temperature of the fluid bed 7 was 1200° C. The temperature of the gas, just below the lower stage 12, was 960° C. and the gas output temperature was 160° C.

The temperature of the sand at the output of the lower stage 12 was 640° C. The gas velocity at a point just under this lower stage was 1.3 m/s and the temperature was 960° C. The maximum free fall velocity of sand particles of 200 μm diameter at this temperature is 1 m/s such that according to these results, the velocity of the gas at the input of the first stage 12 is greater than the maximum free fall velocity of particles of 200 μm.

At a point above the stages, where the gas temperature is 160° C., the gas velocity is only 0.45 m/s whereas the maximum free fall velocity of particles of 200 μm at this temperature is 1.4 m/s. Therefore above the stages 12–15, the ratio of velocity is reversed and only particles of smaller dimensions run the risk of being entrained.

It therefore appears, contrary to what was previously considered, that it is possible to operate a heat exchanger in an efficient manner where the average gas velocity in at least one stage is greater than the maximum free fall velocity of the particles and in practice less than 1.5 times the maximum free fall velocity.

Comparative tests were run using an exchanger of the type shown in FIG. 1 wherein the column had an inside diameter of 32 cm. and had only one stage filled with a stack of Pall rings 25×25 mm. made of a glazed stone and where the stack had a porosity of 74% supported by a grill having a porosity of 90%.

Sand having an average size of 200 μm was fed into the exchanger at a delivery rate of 270 kg/h. The input temperature of the sand was 50° C. and the gas input temperature was 250° C.

The increase ΔT of the output temperature of the sand for different gas velocities was measured just underneath the stage and for different stack heights. Results of such measurement are set out in the following table where ΔT is in °C.

| Height | Velocity m/s | | |
|---|---|---|---|
|  | 0.8 | 1.2 | 1.6 |
| 140 mm | 85 | 104 | 100 |
| 250 mm | 94 | 110 | 101 |
| 400 mm | 98 | 115 | 103 |

These results show the following:

1. At high gas velocities (1.6 m/s) an increase of stack height does not noticeably increase the efficiency of the heat exchange. Therefore it appears advisable to use a stack height of 140 mm. for the lower stage.

2. Efficiency is at a maximum for a gas velocity close to the maximum free fall velocity of the particles.

3. For a stack height of 140 mm., the efficiency at a gas velocity of 1.6 m/s is only slightly less than maximum efficiency.

4. For slower gas velocities, an increase in stack height results in an increase in efficiency that is greater the smaller the gas velocity.

Therefore it appears advisable to have a stack height for the lower stage of 140 mm. and to have the gas passing through this stage, measured underneath the stage, flow at a velocity greater than the maximum free fall velocity (for example 1.6 m/s) and at higher stages, to use increased stack heights (for example a height of 250 mm. for the second stage, 400 mm. for the third stage, etc.)

By way of a further example, the exchanger of the type illustrated in FIG. 1 was made to operate as previously described except that the temperature of the output gas was 150° C. and the temperature of the sand particles at the output of the lower stage was 634° C. The output temperature at the level of the overflow conduit 8 of the fluidized bed 7 was 1120° C.

The heat balance of the installation was calculated as follows:

Input

Air at 40° C.: $1.30 \times 40 \times 1650 \times \frac{1}{3600} =$  24

Sand at 25° C.: $0.75 \times 25 \times 3250 \times \frac{1}{3600} =$  17

Fuel oil: $44150 \times 113.56 \times \frac{1}{3600} =$  1308

Total: 1349 kW

Output

Fumes at 165° C.: $1.41 \times 165 \times 1715 \times \frac{1}{3600} =$  112

Sand at 1120° C.: $1.17 \times 1120 \times 3250 \times \frac{1}{3600} =$  1183

Total: 1295 kW

The losses in the installation were 54 kW or 4%.

The total losses including the loss from the fumes were:

54 + 112 = 166 kW or 13%

The heat balance for the installation shows, in comparison with a single fluidized bed, that an exchanger constructed according to the invention results in savings of a considerable amount of energy. Actually, the temperature of the sand during its flow through the packing elements reaches about one half of its final value. If there were only one dense fluidized bed, it would be necessary to heat the sand to a much higher degree and expend approximately twice the energy that is consumed in an exchanger according to the invention. If, however, an exchanger were made to operate under the same conditions as set out above but without using a fluidized bed in the lower part of the column, a temperature of 1500° C. would have to be reached at the lower stage which, with materials normally making up a packing support, would not effectively resist the temperature.

Figure 2:
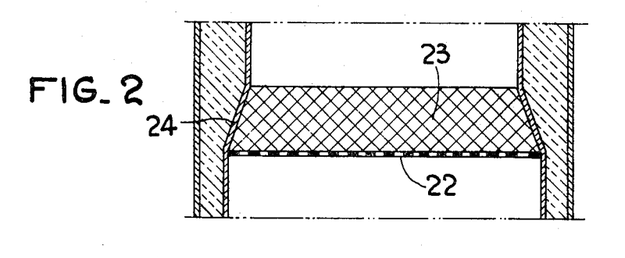
FIG. 2 is a diagrammatical sectional view of a second embodiment of a stage utilized in a heat exchanger constructed according to the invention.
Figure 3:
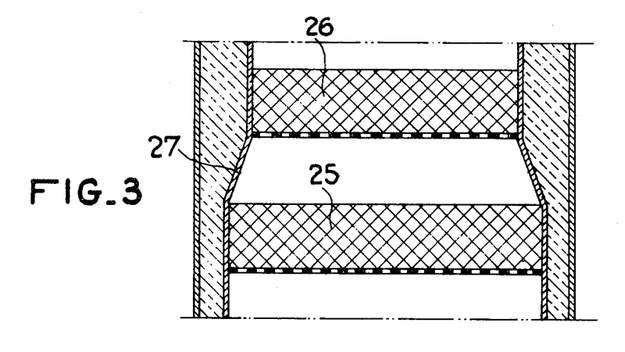
FIG. 3 is a cross-sectional view of a third embodiment of a stage utilized in a heat exchanger constructed according to the invention.
Figure 4:
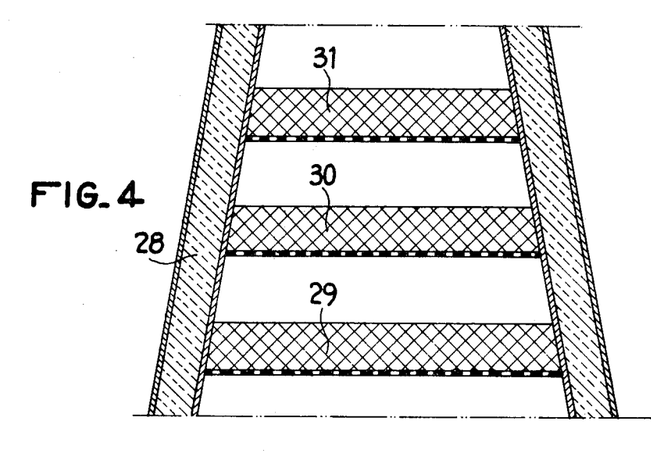
FIG. 4 is a cross-sectional view of a fourth embodiment of a stage utilized in a heat exchanger constructed according to the invention; and, FIG. 5 is a schematic sectional view of the heat exchanger of FIG. 1 combined with a further heat exchanger.

FIGS. 2, 3 and 4 illustrate different embodiments of stages whereby gas velocity may be maintained at an optimum value and where the gas is cooled as it rises in the heat exchanger. The stage illustrated in FIG. 2 comprises a grill 22 having wide meshes which supports a stack of Pall rings 23 inside a conical portion 24 of the column which joins two other portions of the column having different diameters. The cross-sectional area of the column portion above the stage is adjusted as a function of the temperature reached above the stage so as to adjust the gas velocity at the input of the next higher stage.

The stages illustrated in FIG. 3 have constant cross-sections with the lower stage 25 having a larger cross-section than the upper stage 26. Both stages 25 and 26 are joined by a conical part 27 of the column.

The stages illustrated in FIG. 4 are placed in a column 28 which is conical in shape and which narrows in an upward direction. Stages 29, 30 and 31 are positioned in the conical column and have the same degree of taper as the column.

A heat exchanger according to the invention, in addition to being used for heating solid particles, may also be utilized for recovering heat from hot solid particles of foundry sand that have been made to burn.

It is also possible following the teachings of the invention to use two combined columns wherein one column functions as a heat recovery unit and the other as a heater in connection with the same solid particles. Such a combination makes it possible to have a gas-gas heat exchange with slight load losses and, optimally, to provide an intermediate storage of sensible heat by using solid particles as a heat carrying medium between the two gases.

A heat exchanger constructed according to the invention can also be utilized to gain heat from solid particles. For example, heat may be recovered from foundry sands or bituminous schists the combustible constituents of which are totally or partially burned in the exchanger.

In order to recover the heat of solid particles comprising combustible substances, it is possible to use an exchanger as defined above, which thus comprises a first exchanger, wherein the solid particles are introduced at the top of the column such that the combustible substances burn into the column. This first heat exchanger can be combined with a second heat exchanger comprising a column having at least one stage therein made up of a stack of packing elements such that the hot solid particles coming from the fluidized bed of the first heat exchanger are introduced into the second heat exchanger above the packing elements of the second heat exchanger. The second heat exchanger is fed by cold air that is heated in the exchanger and is then introduced into the bottom of its first heat exchanger. The second heat exchanger can include a fluidized bed in its lower part and therefore be of the same type construction as the first heat exchanger. Such a combination of a first and second heat exchanger makes it possible to recover the sensible heat of the solid particles and gas.

The combination of heat exchangers also makes it possible to operate the system whereby irregularities of operation of the packed columns may be smoothed out due to a reserve supply of heat energy carried by the constituents flowing through the packed columns. The period of stay in the fluidized bed is not modified if the delivery of gas through the grill supporting the bed varies, but the delivery of gas must be adjusted to the delivery of solid particles. The combination of the two exchangers further makes it possible to assure that the device operates at optimum temperature since the temperature may be regulated by injection of fuel into the fluidized bed of the first exchanger.

Figure 5:
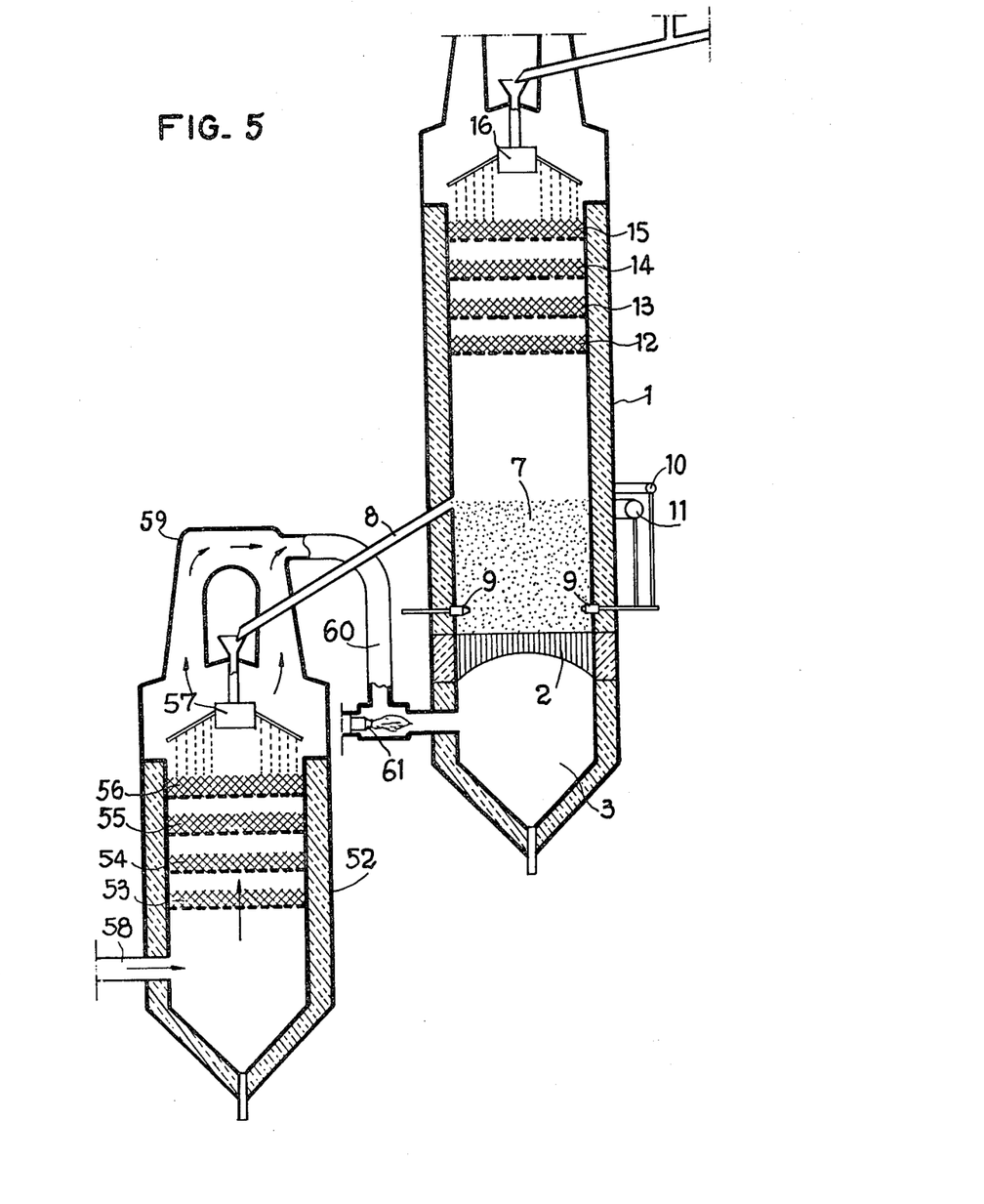

Referring to FIG. 5, there is illustrated the combination of heat exchangers intended for treating foundry sands that contain a combustible polymer material which is to be burned off.

The combination of exchangers comprises a first column and a first exchanger of the same type as shown in FIG. 1 but which is fed by gases emanating from a second column of a second heat exchanger. The parts of the first column of the first heat exchanger are identical with those of the heat exchanger of FIG. 1 and are identified with the same reference numerals.

The second column 52 of the second exchanger has four stages 53, 54, 55 and 56 of the same type of stages 12 to 15 of the first heat exchanger. A rotary distributor 57 is positioned above the upper stage 56 for distributing solid particles into the second column that were removed from the fluidized bed of the first column by overflow conduit 8.

The second column 52 has an air input 58 located at its bottom through which air flows into the column. A flue 59 is contained at the upper part of the column for the removal of gas from the column and this flue connects to a conduit 60 which extends to the wind box 3 of the first heat exchanger.

Conduit 60 may be provided with a heating burner 61 to further heat the gases emanating from the second heating exchanger if necessary.

The operation of the combination of heat exchangers of FIG. 5 is as follows. The column of the first heat exchanger is fed foundry sand particles which contain combustible burner material. This material is burned off in column 1 of the first heat exchanger where a fluidized bed 7 of hot sand particles is formed. These hot particles overflow into conduit 8 where they fall into the distributor 57 after which they go through the packing elements of the various stages 53–56. Input air is introduced into the lower part of column 52 and is heated as it flows upwardly in the column contacting the hot particles which are then gradually cooled by the gas. The gas thus heated flows by conduit 60 into column 1 where it is used as combustion hot air. If the temperature of this air is not sufficient to initiate combustion, burner 61 may be operated to assure firing in column 1. Fuel may be injected into the fluidized bed 7 to compensate for any shortage of heat energy entering by way of conduit 60.

I claim:

1. A heat exchanger for exchanging heat between solid particles and a gas where said exchanger has a vertically extending column in which the solid particles flow downwardly under gravitational forces and gas flows upwardly and at least one stage in said column having a stack of packing elements and a support for supporting said packing elements; the improvement comprising in that said support has openings therein having meshes the porosity of which is at least 75% of the porosity of the stack of packing elements through which said gas may flow at a velocity whereby the solid particles will form a loose fluidized bed in contact with the support.

2. A heat exchanger according to claim 1 wherein the porosity of the meshes is 90% of the porosity of the stack of packing elements.

3. A heat exchanger according to claims 1 or 2 wherein the height of each said stage is 3 to 20 times the height of each said packing element.

4. A heat exchanger according to claim 1 wherein said column has a plurality of stages therein and wherein the gas velocity into the hottest stage is between the average free fall velocity of the particles and 1.5 times said free fall velocity.

5. A heat exchanger for exchanging heat between solid particles and a gas where said exchanger comprises a hollow vertically extending column having a greater cross-sectional area at its lower part than at its upper part in which the solid particles flow downwardly under gravitational forces and gas flows upwardly and at least one stage in the upper part of said column comprising a stack of packing elements; the improvement comprising in having a grill in the lower part of said column having a cross-sectional area larger than the cross-sectional area in the upper part of the column adapted to support a bed of solid particles, means for introducing said gas into said column below said grill whereby said gas will flow upwardly through said grill and bed to fluidize said bed, and means for feeding air into said column and having at least one burner placed above said grill through which a combustible substance may be injected into said bed.

6. A heat exchange according to claim 5 having in addition a preheating burner for preheating air prior to being fed into said column.

7. A heat exchanger apparatus for exchanging heat between solid particles and a gas where said apparatus includes a first heat exchanger in which solid particles in the form of combustible substances are burned and where the first heat exchanger comprises a hollow vertically extending first column in which the solid particles flow downwardly under gravitational forces and gas flows upwardly and at least one stage in the upper part of said first column comprising a stack of packing elements; the improvement comprising in having a grill in the lower part of said first column having a cross-sectional area substantially equal to the cross-sectional area of said lower part adapted to support a bed of solid particles, means for introducing said gas into said first column below said grill whereby said gas will flow upwardly through said grill and bed to fluidize said bed, a burner for preheating said gas prior to being introduced in said first column to initiate burning of said particles in the fluidized bed, a second heat exchanger including a second column having at least one second stage in said second column comprising a second stack of packing elements, transfer means for transferring particles in the bed of the first heat exchanger to the top portion of the column of the second heat exchanger, rotary distribution means for distributing said particles into said top portion, gas inlet means at the bottom of said second column and gas connection means connecting the top portion of the second column with the bottom portion of the first column whereby gas passing to the first heat exchanger is preheated by the particles in the second heat exchanger.

8. A heat exchanger according to claim 7 wherein the second heat exchanger has a fluidized bed of solid particles in its lower portion.

9. An apparatus adapted for burning combustible substances accompanying solid particles comprising a first heat exchanger having a first hollow vertically extending column, at least one stage in an upper part of said first column having a first stack of packing elements and a lower part of said first column including a grill adapted to support a bed of solid particles and means for introducing gas below said grill into said first column whereby said gas will flow upwardly through said grill and bed to fluidize said bed and whereby said particles may flow downwardly in said column under gravitational forces against the flow of said gas flowing upwardly in said first column, a second heat exchanger having a second column including a second stage comprising a second stack of packing elements, transfer means for transferring particles from the bed of the first column to the top portion of said second column, rotary distribution means for distributing said particles into said top portion, gas connection means including heating means therein connecting the top portion of said second column with the bottom portion of said first column whereby gas through said first heat exchanger is preheated by the particles of the second heat exchanger and a burner positioned in said first column above said grill for controlling temperature in said bed.

10. A heat exchanger for cooling gas on contact with solid particles where said exchanger has a vertically extending column in which the solid particles flow downwardly under gravitational forces and gas flows upwardly and a plurality of stages in said column each having a stack of packing elements and each having a support for supporting said packing elements; the improvement comprising in that each said support has openings therein having meshes the porosity of which is at least 75% of the porosity of the stack of packing elements through which said gas may flow at a velocity whereby the solid particles will form a loose fluidized bed in contact with the support and where in the cross-section of the stages decreases in the direction of flow of the gas.

11. A heat exchanger for heating gas on contact with solid particles where said exchanger has a vertically extending column in which the solid particles flow downwardly under gravitational forces and gas flows upwardly and a plurality of stages in said column each having a stack of packing elements and each having a support for supporting said packing elements; the improvement comprising in that each said support has openings therein having meshes the porosity of which is at least 75% of the porosity of the stack of packing elements through which said gas may flow at a velocity whereby the solid particles will form a loose fluidized bed in contact with the support and wherein the cross-section of the stages increases in the direction of flow of the gas.

12. A heat exchanger according to claim 1 wherein the gas is cooled on contact with the solid particles and wherein the column has a plurality of stages thereon the stack heights of which increase in the direction of flow.

13. A heat exchanger according to claim 1 wherein the gas is heated upon contact with the solid particles and wherein the column has a plurality of stages therein the stack heights of which decrease in the direction of flow of gas.

14. A heat exchanger for exchanging heat between solid particles and a gas where the gas is cooled on contact with the solid particles, where said heat exchanger has a vertical column in which the solid particles flow downwardly under gravitational forces and in which gas flows upwardly and a plurality of stages in said column each having a stack of packing elements and a support for supporting said packing elements; the improvement comprising in that each said support has openings therein having meshes the porosity of which is at least 75% of the porosity of the stack of packing elements supported by said support and through which said gas may flow at a velocity whereby the solid particles will form a loose fluidized bed in contact with each said support and in that the cross sections of said stages decrease in the direction of flow of the gas.

15. A heat exchanger for exchanging heat between solid particles and a gas where the gas is heated on contact with the particles, where said exchanger has a vertically extending column in which the solid particles flow downwardly under gravitational forces and in which gas flows upwardly and a plurality of stages in said column each having a stack of packing elements and a support for supporting said elements; the improvement comprising in that each said support has openings therein having meshes the porosity of which is at least 75% of the porosity of the stack of packing elements supported by said support and through which said gas may flow at a velocity whereby the solid particles will form a loose fluidized bed in contact with each said support and in that cross sections of said stages increase in the direction of flow of the gas.

16. A heat exchanger for exchanging heat between solid particles and a gas where said exchanger has a vertically extending column in which the solid particles flow downwardly under gravitational forces and the gas flows upwardly with said column having therein at least one stage comprising a stack of packing elements and a support for supporting said stack; the improvement comprising in that said support has openings therein through which said gas flows with said openings being of a size whereby the specific pressure drop of the gas passing therethrough is smaller than the specific pressure drop of gas passing through said stack.

* * * * *